Patented Aug. 18, 1942

2,293,353

UNITED STATES PATENT OFFICE 2,293,353

PROCESS FOR THE POLYMERIZATION OF OLEFINS

Richard Z. Moravec, William T. Schelling, and Charles F. Oldershaw, Berkeley, Calif., assignors to Shell Development Company, San Francisco, Calif., a corporation of Delaware No Drawing. Application April 19, 1937, Serial No. 137,798

10 Claims. (Cl. 260—683)

This invention relates to the manufacture of higher boiling hydrocarbons from lower boiling olefins and deals, particularly, with the polymerization of olefins by contact with aqueous mineral acid solutions.

An important object of the invention is the provision of novel catalytic agents which are not only very resistant to poisoning and other deteriorating influences but also are very effective in controlling the polymerization reaction. A further object of our invention is the provision of a highly flexible polymerization procedure whereby mixtures of olefins of different reactivities may be treated to selectively convert one olefin or certain olefins only, or to non-selectively polymerize the olefinic constituents as desired.

Aqueous mineral acid solutions of various strengths have been used for the polymerization of olefins in both the liquid and vapor phase. Unless resort is had to a separate step of absorption of the olefin in the acid before polymerization, these procedures are exceedingly difficult to control as they depend upon a very delicate balance of the factors of acid concentration, temperature, time of contact and acid: olefin ratio. Small variations in any of the these factors may completely alter the nature of the product. Particularly in the conversion of normally gaseous olefins to polymers for use in gasoline where the boiling range of the product must be rigidly controlled, the narrow limits render commercial operations by prior methods difficult and expensive. These same factors influence the results obtainable by the procedure of our invention and for the best results should be regulated and controlled, but due to the greater flexibility of our process, this control is more readily achieved practically and is not affected by the inevitable fluctuations in feed, etc., which are encountered in plant scale operations. Furthermore, by our procedure, this flexibility of operation is secured without the attendant difficulties due to short catalyst life which are encountered when using anhydrous catalysts.

The process of our invention essentially comprises contacting the olefin containing hydrocarbon to be polymerized with a solid contact mass impregnated or coated with an aqueous solution of an acid acting agent at a temperature and pressure at which the desired polymer is formed.

Our process may be applied to olefins in a pure state either as individual olefins or pure olefinic mixtures or to such olefin or olefins in admixture with paraffins and/or other compounds which may or may not undergo polymerization or other change under the reaction conditions, although the presence of oxidizing agents, particularly substantial amounts of free oxygen, is obviously undesirable. Thus tertiary olefins, i. e. olefins containing the group

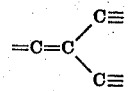

such as isobutylene, trimethyl ethylene, unsymmetrical methyl ethyl ethylene, tetramethyl ethylene and the like, or secondary olefins, i. e. olefins of at least 3 carbon atoms such as propylene, butene-1, butene-2, isopropyl ethylene, pentene-1, pentene-2, etc., containing the group

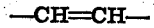

may be used. Instead of the olefins themselves, the corresponding alcohols, particularly the tertiary alcohols, may be employed. Suitable sources of olefins are, for example, hydrocarbons derived from mineral oils, as petroleum products, shale oil, and the like, or natural gas, or from coal, peat and like carboniferous natural materials as well as animal or vegetable oils, fats and waxes. The olefins present in the starting material may be of natural occurrence, the result of a dehydrogenation, distillation, liquid or vapor phase cracking or other suitable treatment. Olefinic mixtures may be used as produced or advantageously after separation into olefin containing fractions consisting of, or predominating in hydrocarbons containing the same number of carbon atoms to the molecule although wider fractions containing non-isomeric olefins may also be used.

The process is particularly well adapted to the production of polymers boiling within the gasoline range from the lower olefins and when so applied gives products which may themselves be used as components of anti-knock fuels or which may be hydrogenated to paraffins eminently suitable for such use. It is especially advantageous in the production of lower polymers, particularly dimers, by copolymerization of olefins and/or interpolymerization of tertiary olefins with dissimilar olefins whether containing a tertiary unsaturated carbon atom or not.

The catalysts used in our process are aqueous solutions of acid acting agents coated, or more advantageously deposited, on suitable granular supports or carriers. Suitable acid acting agents which may be used include aqueous solutions of inorganic acids such as sulfuric, phosphoric, hydrochloric, and like acids or organic acids such as benzene sulfonic, naphthalene sulfonic, ethyl sulfuric acid, etc., or normal and/or secondary butyl sulfuric acid, etc., or acid salts for example, sodium bisulfate, aluminum hydrogen sulfate, zinc chloride, copper sulfate or mixtures thereof, etc. As supports or carriers, porous materials such as pumice, ceramic chips, charcoal, diatomaceous earth, silica gel and the like are preferred, although less porous or even non-porous materials such, for example, as pressed carbon rings, asbestos, rough glass ware or glass wool, slag wool, clays including fuller's earth, zeolites, etc., wood chips and the like, may be used to advantage. The supports may be of any desired shape but most preferably have a particle size e. g. 4–10 mesh, which permits ready passages of gases therethrough. The nature of the support in conjunction with gas velocity, temperature and pressure, affects very materially the course of the polymerization reaction, for example, by proper choice of support the polymerization of tertiary olefins in the presence of secondary olefins can be carried out selectively without conversion of the latter so that the process may be advantageously used for the preparation of substantially pure secondary olefins from tertiary olefin-secondary olefin mixtures. Other supports with the same acid lead, on the other hand, to preponderant polymerization of the secondary olefin content of similar mixtures. These differences in the activity of the supporting material appear to be connected not only with differences in chemical composition but also with physical differences, particularly porosity.

Ceramic and carbon supports are particularly useful, not only because they are very resistant to both mechanical and chemical deterioration but also because they are readily and cheaply producible in uniform size and reproducible porosity. Also they may be made with non-porous centers and surfaces of any desired porosity. In manufacturing ceramic supports the porosity may be regulated by control of the composition and plasticity of the starting clay, the kneading given and the conditions of firing to give products having a substantially uniform porosity throughout which may be widely varied. We find it more advantageous, however, to use starting materials and kneading and firing conditions which favor the formation of supports of low porosity and to secure the desired surface porosity by impregnating the surface only of the clay, after shaping but before firing, with combustible, or decomposable, or volatile material such, for example, as Glauber's salt, ammonium carbonate, carbon black, sawdust, petroleum oils, etc. The vapors given off by these materials during the firing produce the desired surface porosity while leaving the centers of the pieces relatively non-porous. Such supports require less acid solution for impregnation since little or none is absorbed by the inactive centers.

In addition to the supports themselves suitable distenders may be used to further increase the catalytically active surface. Such distenders are preferably materials of small particle size which also may be porous themselves but not necessarily so. They may be of the same material as the support or may, for example, be materials such as carbon black and the like. The chosen distender may advantageously be mixed or ground with the acid solution to form a paste or the like which can be applied to the surface of the support. Where supports having porous centers are used, the support can be given a preliminary saturation with the acid solution, by soaking with or without application of vacuum and/or pressure, before applying the distender-acid solution paste to the surface.

One suitable method of preparing a preferred form of catalyst for use in the process of our invention comprises mixing the aqueous acid or acids chosen with carbon black and fine charcoal and depositing the resulting wet powder on pressed carbon supports, such, for example, as $\tfrac{3}{16}$ inch carbon rings. Small amounts of secondary alcohol or alcohols corresponding to the secondary olefin or olefins present may be advantageously added to the aqueous acid where a tertiary olefin or tertiary olefins are to be selectively polymerized in the presence of such secondary olefins.

The supports most preferably used are those of about 4 to 10 mesh in size as these provide adequate surface with sufficient free space for passage of the reaction vapors without excessive pressure drop, but larger or smaller particles may also be used. The supports may be of any suitable shape and may be prepared by pressing, extruding, molding or other suitable methods with or without the use of binders or other agents which give increased mechanical strength or other desirable characteristics.

Supports having a porosity equivalent to the absorption of about 15 to about 40 grs. of water per 100 grs. of porous support are preferred, those having porosities between about 15 to 25 being particularly suitable for the interpolymerization of tertiary olefins with secondary olefins while those having surface porosities of about 25 to 40 are preferred for selective tertiary olefin polymerization.

The concentration of the aqueous acid-acting agent used in our process depends upon the nature of the acid-acting agent chosen and the olefin or olefins to be polymerized. Where sulfuric acid, for example, is used for the polymerization of butylenes, concentrations of about 40% to about 70% may be used although we find concentrations between 45% and 55% generally preferable. Instead of free sulfuric acid alone, mixtures with sulfates such as sodium and/or aluminum sulfates, etc., which correspond to the acid sulfates with or without free sulfuric acid may be used. Whatever the nature and concentration of the acid-acting catalytic agent chosen, we find the polymerization temperature and pressure should most preferably be such that the polymer is vaporized as fast as formed. This promotes high yields by removing the desired polymer from the reaction zone before it is converted to undesirable higher polymerization products. It is not necessary to operate at temperatures as high as the normal boiling point of the desired polymer in order to achieve this desirable result since the presence of other volatile components in the reaction mixture will usually permit the polymer to vaporize at lower temperatures either as a result of azeotrope formation or through additive vapor pressure effects. For the production of octenes from isobutylene and/or secondary butylenes, for example, temperatures of about 80° C. to about 120° C. may be used, the higher temperatures being more desirable where extensive conversion of secondary butylenes is desired. Alternatively the process may be carried out under conditions at which the polymer or polymers produced are substantially in the liquid phase. Temperatures of the same order as in vapor phase operations are desirable in such cases so higher pressures are used. Even in our preferred vapor phase procedure we find pressures above atmospheric to be advantageous, about 4 to 10 atmospheres, for example, being generally suitable although higher or lower pressures may be used. High pressures are thus not necessary in our process and may, in fact, be undesirable as they greatly increase the cost of the polymerization apparatus.

In carrying out the process of our invention we find it desirable to saturate the hydrocarbon feed with water at the reaction temperature or otherwise add sufficient water or steam so that the concentration of the acid acting agent is maintained substantially constant. In addition to the polymerization there may in some cases be more or less hydration of olefins present. The alcohols so produced may be separately recovered as a valuable by-product by suitable fractionation of the reaction products or by extraction with suitable solvents, such, for example, as water in the case of the lower alcohols, and in such cases due allowance should be made in adding water in the reaction, for that removed as alcohol. Alternatively the alcohol or alcohols may be returned to the reactor where they will be converted to polymer.

The reaction may be carried out in any suitable apparatus. Suitably heated tubes, which may be horizontal, vertical or inclined, may be packed with the catalyst and fed, continuously or intermittently with the olefin containing hydrocarbon to be polymerized and the necessary water to maintain a substantially constant acid concentration. The polymers produced in accordance with our preferred method of operation may be removed as vapors from the reaction zone with the unreacted gases, if any, and recovered by cooling, compressing, distilling or extracting. The presence of inert or unreacted hydrocarbons, either olefins or paraffins or both, is desirable as an aid not only to temperature control but also to removal of the polymers produced, both in vapor and liquid phase operations.

The following examples showing the results obtained by various procedures comprised within the scope of our invention as applied to the manufacture of octenes from butane-butylene fractions from petroleum cracking containing 16 to 18% isobutylene and 28 to 30% secondary butylenes, also illustrate in somewhat more detail how the process may be applied.

Example I

The effect of porosity of the carrier on the activity of the catalyst is shown by the following tests in which two different lots of majolica of different porosities were used. The catalysts were prepared by saturating the 6 mesh majolica chips with 50% sulfuric acid, draining and packing the saturated chips into copper pipes provided with steam heated jackets. The catalysts were maintained at about 100° C. while the butane-butylene was fed in at the rate of about 1 pound per hour per pound of catalyst. A pressure of about 4 atmospheres was maintained in the reactor and water equal to that removed by the exiting gases was added as steam with the incoming hydrocarbon.

| Porosity of majolica (grams of water absorbed per 100 grams) | Percent isobutylene reacted per pass | Percent secondary butylenes reacted per pass |
| --- | --- | --- |
| 31.9 | 21.0 | 1.7 |
| 19.5 | 24.5 | 29.1 |

Example II

The influence of distenders is shown by the following experiments in which the volume of the catalyst chamber, a vertical steam jacketed tube fed from the top, was 35 cc. and the temperature was 100° C. The pressure was 4 atmospheres, and sufficient water was added with the hydrocarbon in all cases to maintain constant acidity of the catalyst.

| Catalyst | Hydrocarbon input rate | Isobutylene reacted per pass | α and β butylene reacted per pass | Composition of product | |
| --- | --- | --- | --- | --- | --- |
| | | | | Octene | Dodecene |
| 50% $H_2SO_4$ deposited on 10 mesh pumice | Grs./hr. 58.7 | Percent 14.3 | | Percent 84.5 | Percent 15.5 |
| 50.7% $H_2SO_4$ deposited on 10 mesh pumice in admixture with carbon black | 60.1 | 50.8 | 6.6 | 80.6 | 19.4 |
| 50% $H_2SO_4$ deposited on 6 mesh majolica without distender | 50.55 | | None | [1] 75.3 | 24.7 |
| 50% $H_2SO_4$ deposited on 6 mesh majolica with carbon black distender | 50-55 | | 10.2 | [2] 92.3 | 7.7 |

[1] 30.6% of the reacted isobutylene recovered as tertiary butyl alcohol.
[2] 6.6% of the reacted isobutylene recovered as tertiary butyl alcohol.

Example III

For each catalyst there appears to be a hydrocarbon throughput rate at which, under otherwise constant conditions, the polymer production is at a maximum. This is shown by the following results obtained when using a temperature of 100° C. and 4 atmospheres pressure.

| Catalyst weight ratio | | | Hydrocarbon feed rate grs./hr./gr. of catalyst | Isobutylene reacted per pass | α and β butylene reacted per pass | Composition of polymer | |
| --- | --- | --- | --- | --- | --- | --- | --- |
| 50.7% $H_2SO_4$ | Pumice | Carbon black | | | | Octenes | Dodecenes |
| 2.5 | 13.5 | 2.25 | 0.8 | Percent 81.7 | Percent 7.0 | Percent 79.8 | Percent 20.2 |
| 2.7 | 17.8 | 2.5 | 2.6 | 50.8 | 6.6 | 80.6 | 19.4 |
| 2.2 | 14.2 | 2.0 | 3.7 | 19.7 | 0.6 | 88.3 | 11.7 |
| 2.1 | 13.9 | 1.9 | 5.2 | 10.6 | | 82.0 | 18.0 |

Example IV

The following experiments made in the same type of apparatus as used in Example II but operating at 100° C. under atmospheric pressure with a hydrocarbon feed rate of about 1 gram per hour per gram of catalyst, show the effectiveness of other acid acting agents as well as sulfuric acid.

| Composition of aqueous acid acting agent, mol percent | | | Concentration of— | | Support | Octenes in product |
|---|---|---|---|---|---|---|
| $Na_2SO_4$ | $H_2SO_4$ | $H_2O$ | Free acid | Total acid acting agent | | |
| | | | *Percent* | *Percent* | | *Percent* |
| 40 | 44 | 16 | 58 | 96 | Pumice with carbon black distender. | 67 |
| None | 73.4 | 26.6 | 94 | 94 | ......do...... | 67 |
| 24 | 32 | 44 | 49.7 | 89.2 | ......do...... | 6" |
| $Al_2(SO_4)_3$ | $H_2SO_4$ | $H_2O$ | | | | |
| 40 | 40 | 20 | Zero | 98.1 | ......do...... | 43 |
| 10 | 10 | 80 | ...do...... | 75.4 | ......do...... | 57 |
| 30 | 20 | 50 | ...do...... | 90.7 | ......do...... | 43 |
| 3.3 | 15.3 | 81.4 | 44.5 | 64.2 | ......do...... | 70 |
| 16.7 | 50.0 | 33.3 | 78.3 | 94.7 | ......do...... | 44 |

The life of our catalysts is very long, the losses being practically only through entrainment of acid solution in the hydrocarbon vapors and a very small amount of $SO_2$ evolution when using aqueous sulfuric acid. The latter loss may be substantially avoided by replacing 5 to 20% of the $H_2SO_4$ with $H_3PO_4$. The entrainment loss may be compensated for by dripping acid onto the carrier intermittently or continuously while the plant is in operation. In certain cases the activity of the catalyst may be found to gradually decrease during use. This is believed to be usually due to the accumulation of higher boiling polymers. Whatever its cause we have found that the activity may be restored by periodically heating to a high temperature, e. g. about 200° C., preferably by direct heating with steam in order to avoid concentration of the acid. By the use of such procedures the catalyst life appears to be practically unlimited, while the production of 166 pounds or more of polymer per pound of sulfuric acid is readily achieved.

It will thus be apparent that the process of our invention offers many advantages, particularly in economy and flexibility of operation, over prior olefin polymerization methods. It is not only capable of wide variation with respect to the type of catalysts and olefins that may be so polymerized, but also the operating arrangement may be greatly modified. For example, it will be obvious that where packed towers or vertical tubes are used as in the cited examples, the hydrocarbon may be as well fed from the bottom as from top and in such cases the presence of excess aqueous acid solution over that absorbable by the carrier will not be detrimental but may in some cases even be advantageous since such acid may be intermittently or continuously withdraw and so serve as a means for removal of the high boiling polymers and/or other undesirable products which tend to interfere with the polymerization instead of, or in addition to, the periodic steam heating previously described as suitable therefor. When operating at temperatures and pressures at which the polymer produced is in the liquid phase, e. g. at 100–120° C. and 300–500 pounds pressure, such acid serves to float off the polymer from the catalyst to form an upper layer of hydrocarbons which may be drawn off for recovery of product. Furthermore, the hydrocarbon may be fed to two or more reactors in series or series-parallel arrangement, which reactors may each be filled with the same catalyst and operated under the same or different conditions of temperature, etc., or which may be filled with different catalysts and likewise may be operated under the same or different conditions. In this manner, for example, the tertiary olefins may be selectively or preponderantly reacted in the first polymerization step while the secondary olefins are reacted in a subsequent step or steps. In such multistage polymerization methods, the process of our invention may be used in conjunction with as well as in lieu of, conventional procedures of the prior art. Still other changes such as will be apparent to those skilled in the polymerization art may be made without departing from the spirit of our invention which is not to be regarded as limited to the details of operation disclosed nor by the soundness of the theories advanced in explanation of the improved results attained, but only by the terms of the accompanying claims, in which it is our intention to claim all novelty inherent therein as broadly as is possible in view of the prior art.

We claim as our invention:

1. A process of producing octenes from butylenes which comprises contacting butylene containing hydrocarbon with ceramic material of about 4 to about 10 mesh having a porous surface of a porosity such that at least 15 and not more than about 40 grams of water are absorbed per 100 grams of porous material saturated with a film of a 40 to 70% aqueous polybasic mineral acid solution, at 80 to 120° C., under about 4 to 10 atmospheres pressure until a major part of the butylenes reacted are converted to octenes.

2. A process of reacting a tertiary olefin with a secondary olefin which comprises contacting hydrocarbon containing said olefins with majolica of about 15 to 25 surface porosity saturated with a film of aqueous sulfuric acid under polymerizing conditions until a major part of the said olefins reacted are interpolymerized.

3. A process of selectively polymerizing tertiary olefin in the presence of secondary olefin which comprises contacting hydrocarbon containing said olefins with a majolica of about 25 to 40 surface porosity saturated with a film of an aqueous polybasic mineral acid solution under polymerizing conditions until a major part of said tertiary olefin is polymerized.

4. A process of selectively polymerizing tertiary olefin in the presence of secondary olefin which comprises contacting under polymerizing conditions hydrocarbon containing said olefins with a majolica of about 25 to 40 surface porosity saturated with a film of an aqueous solution containing sulfuric and phosphoric acids wherein the phosphoric acid content is 5 to 20% by weight of the sulfuric acid until a major part of said tertiary olefin is polymerized.

5. A process of producing high boiling hydrocarbons from normally gaseous olefins which comprises contacting such olefins with a solid contact mass substantially coated with an aqueous solution of sulfuric acid and sodium sulfate, at a temperature sufficiently high to effect volatilization and removal of polymers as formed, removing the gases and vapors and separately recovering normally liquid polymers therefrom.

6. In the process of producing liquid polymers useful as motor fuels by polymerizing gaseous olefins, the improvement which comprises subjecting mono-olefin gas to contact with a mixture of sulfuric acid and an alkali metal acid sulfate.

7. A process of producing higher boiling hydrocarbons from gaseous olefins which comprises contacting such olefins with a solid contact mass substantially coated with a solution of sulfuric acid and sodium sulfate.

8. A process of producing higher boiling hydrocarbons from gaseous olefins which comprises contacting a gaseous olefin with a solid contact mass substantially coated with an aqueous solution of a strong polybasic mineral acid and a metal salt of said acid.

9. A process of producing higher boiling hydrocarbons from gaseous olefins which comprises contacting a gaseous olefin with a solid contact mass substantially coated with a mixture of sulfuric acid and a metal sulfate.

10. A process of producing higher boiling hydrocarbons from gaseous olefins which comprises contacting a gaseous olefin with a solid contact mass substantially coated with a mixture of sulfuric acid and an acid-acting metal sulfate.

RICHARD Z. MORAVEC.
WILLIAM T. SCHELLING.
CHARLES F. OLDERSHAW.